United States Patent [19]
Bertagna et al.

[11] Patent Number: 6,088,745
[45] Date of Patent: Jul. 11, 2000

[54] LOGICAL OUTPUT QUEUES LINKING BUFFERS ALLOCATED USING FREE LISTS OF POINTER GROUPS OF MULTIPLE CONTIGUOUS ADDRESS SPACE

[75] Inventors: Drew Bertagna, Agoura Hills; Anees Narsinh, Pacific Palisades, both of Calif.

[73] Assignee: Xylan Corporation, Calabasas, Calif.

[21] Appl. No.: 09/040,170

[22] Filed: Mar. 17, 1998

[51] Int. Cl.[7] .............................. G06F 5/06; H04L 12/56
[52] U.S. Cl. ............................ 710/56; 370/413; 370/417
[58] Field of Search ............................ 341/51; 370/413, 370/417; 709/249; 710/129, 56

[56] References Cited

U.S. PATENT DOCUMENTS

| | | | |
|---|---|---|---|
| 5,367,643 | 11/1994 | Chang et al. ............................ | 710/129 |
| 5,602,841 | 2/1997 | Lebizay et al. .......................... | 370/413 |
| 5,682,553 | 10/1997 | Osborne ...................................... | 710/56 |
| 5,815,097 | 9/1998 | Schwartz et al. ......................... | 341/51 |
| 5,841,990 | 11/1998 | Picazo, Jr. et al. ...................... | 709/249 |

*Primary Examiner*—Thomas C. Lee
*Assistant Examiner*—Albert Wang
*Attorney, Agent, or Firm*—Scot A. Reader

[57] ABSTRACT

A data transfer system efficiently allocates contiguous address spaces in a destination storage area to packets by maintaining a plurality of lists from which different amounts of contiguous address spaces are allocated. List selection is made based on known or presumed packet characteristics. By arranging different lists to supply contiguous address spaces in different amounts based on packet-specific characteristics, over-allocation of address space may be reduced considerably while contiguous address space is guaranteed on a continuous basis.

22 Claims, 8 Drawing Sheets

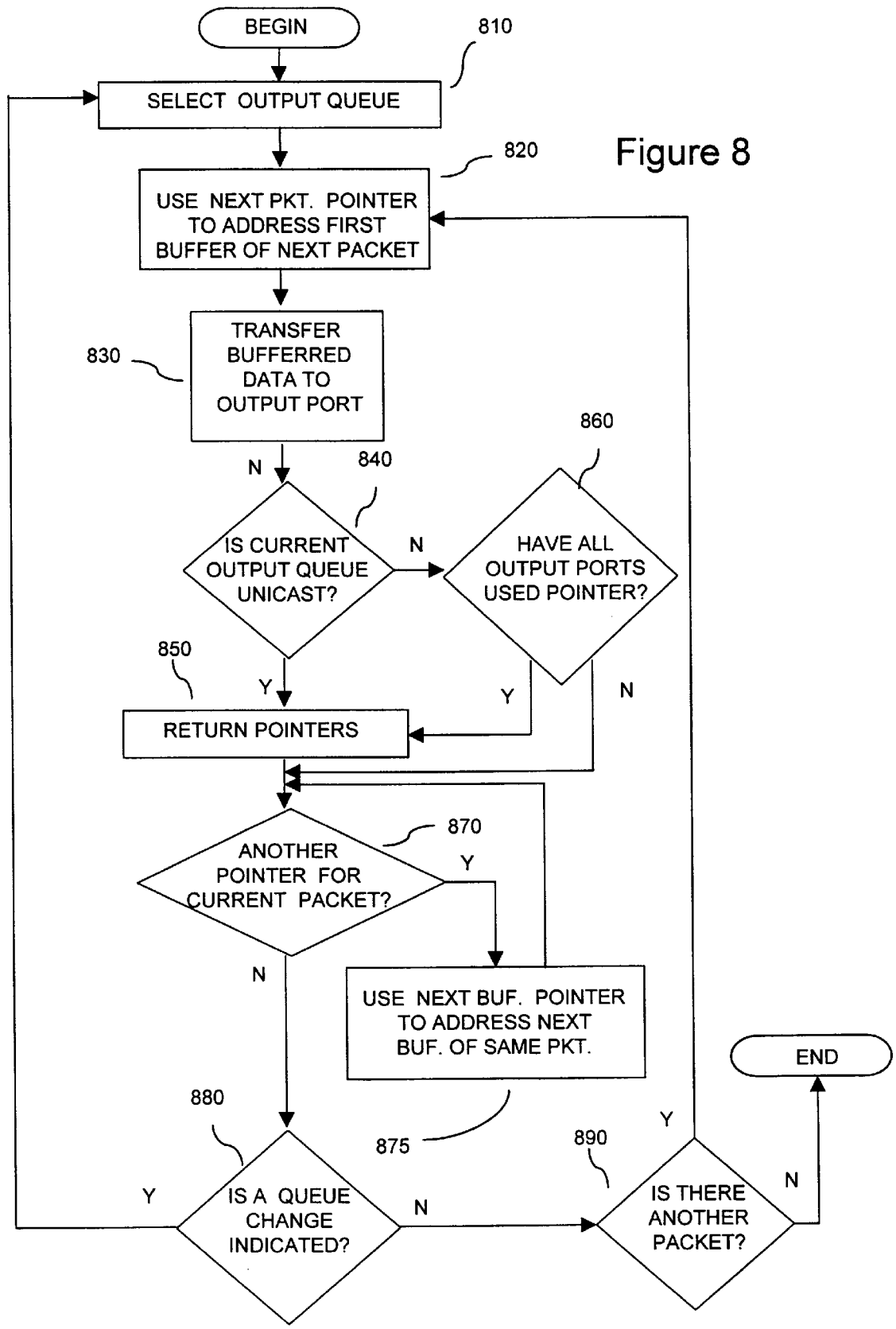

LOGICAL OUTPUT QUEUES LINKING BUFFERS ALLOCATED USING FREE LISTS OF POINTER GROUPS OF MULTIPLE CONTIGUOUS ADDRESS SPACE

BACKGROUND OF THE INVENTION

The present invention relates to a system for transferring data between storage areas and, more particularly, to a data transfer system in which pointers to "free" buffers are allocated repetitively to transfer protocol data units from one data storage area into contiguous address spaces in another data storage area in a data communication switch.

Data communication switches receive packets from one network and switch them to other networks. Packets must be stored in data storage areas within such switches while switching information is processed and to avoid contention among packets competing for switching resources. Such transfers are often accomplished in hard-wired logic using direct memory access (DMA) transfer.

Basically, DMA transfer describes a process in which packets are transferred directly between a source and destination area of data storage instead of transferring them to a central processing unit and then from the central processing unit to the destination data storage area. By reducing the data transfer process to a relatively low-level task implemented in hard-wired logic, DMA transfer can often be accomplished faster than in processor-dependent data transfer. At the same time, however, DMA transfer's reliance on hard-wired logic as the transfer mechanism places practical constraints on how such transfers are effectuated. One constraint inherent in many DMA transfer systems requires that each packet be transferred into a contiguous address space within the destination area of data storage.

A technical challenge arising in DMA transfer systems requiring contiguity is how to buffer packets efficiently. In many conventional DMA transfer systems where there is no contiguity requirement, efficiency is achieved by allocating to packets pointers which address available, or "free", constant-byte buffers in a destination storage area in a repetitive cycle on an "as needed" basis. This results in relatively small packets being allocated a single buffer pointer and relatively large packets being allocated multiple buffer pointers. Because every packet is allocated the approximate amount of address space it needs, the destination storage area may be provided using a relatively small memory. Unfortunately, however, such efficient conventional systems fail to provide contiguity for multi-buffer packets because buffer pointers are inevitably returned and real-located in a different order than the order of original allocation. While it would be possible to guarantee contiguous address space by modifying such conventional systems such that every packet is allocated a single pointer to a buffer having a "system maximum" buffer size, i.e., a buffer size as large as the largest packet which might occur system-wide, smaller packets would then be allocated far more address space than they need and a relatively large memory would be required for the destination storage area. Thus, such a modified system would sacrifice efficiency for the sake of maintaining contiguity.

The above-stated problem often arises in multi-protocol switching environments. In such environments, the "system maximum" buffer size would be dictated by the protocol-specific packet size limitation which is the highest among all such limitations for the various protocols operative within the system. Selecting such a "system maximum" buffer size as a universal buffer size for the sake of maintaining contiguity would result in most packets being allocated substantially more address space in the destination data storage area than is actually required. Such an over-allocation of address space would create memory requirements for the destination storage area which are unacceptably high.

Accordingly, there is a general need for a DMA transfer system which allocates contiguous address spaces in the destination storage area that are not grossly oversized relative to the size of the buffered packets, and there is a particular need for a such a DMA transfer system in multi-protocol switching environments.

SUMMARY OF THE INVENTION

In its most basic aspect, the present invention provides a DMA transfer system which allocates contiguous address spaces tailored to fit packets being buffered by maintaining a plurality of free buffer pointer lists from which contiguous address spaces are allocated in different amounts and selecting from among the plurality of free lists on a packet-by-packet basis based on known or presumed characteristics of inbound packets. By arranging different free lists to supply buffer pointers to different amounts of contiguous address space and selecting from among the free lists based on packet-specific characteristics, over-allocation of address space may be reduced considerably while contiguous address space is guaranteed on a continuous basis. Therefore, the destination storage area may be implemented in a substantially smaller memory, reducing memory overhead.

In another aspect, the plurality of free lists provide contiguous address space in different amounts by supplying pointers to contiguous standard-sized buffers in different multiples. Pointers to contiguous standard-sized buffers are allocated to inbound packets from the list from which buffer pointers are allocated in the multiple estimated, based on the governing packet-specific characteristic, to provide, without risking under-allocation, the lowest over-allocation of address space to the inbound packet. Inbound packets are DMA-transferred to the contiguous buffers addressed by the allocated buffer pointers and are eventually DMA-transferred out of the contiguous buffers to output ports. Pointers to contiguous buffers which have been read to output ports are always returned to the free lists from which they were originally allocated in the same multiples in which they were originally allocated. Through the expedient of maintaining a plurality of free lists from which pointers to contiguous buffers are allocated in different multiples based on packet-specific characteristics and returning the allocated buffer pointers to the free lists from which they were originally allocated, contiguous address spaces are allocated to packets efficiently and on a continuous basis.

In a preferred embodiment, the governing packet-specific characteristic for making pointer allocation decisions is packet protocol type. The standard buffer size and the different multiples in which buffer pointers are allocated from the plurality of free lists are selected such that the allocated contiguous address spaces are at least as large but not substantially larger than necessary to buffer a maximum size packet of different protocol types operative in the system. Pointers to contiguous standard-sized buffers are allocated to each inbound packet from the free list from which pointers are allocated in the multiple which would provide the lowest over-allocation of address space to a theoretical maximum size packet of the same protocol type as the inbound packet. By arranging different free lists to supply contiguous buffer pointers in multiples based on a "protocol maximum" address space size rather than a "system maximum" address space size, over-allocation of address space is reduced considerably while the contiguity requirement is met on a continuous basis.

These and other objects of the present invention may be better understood by reference to the following detailed description, taken in conjunction with the accompanying drawings which are briefly described below. Of course, the actual scope of the invention is defined by the appended claims.

BRIEF DESCRIPTION OF THE DRAWINGS

FIG. 8 is a flow diagram illustrating DMA processing and transfer of packets from the packet queue to the output ports in a DMA transfer system.

DETAILED DESCRIPTION OF THE PREFERRED EMBODIMENT

Figure 1:
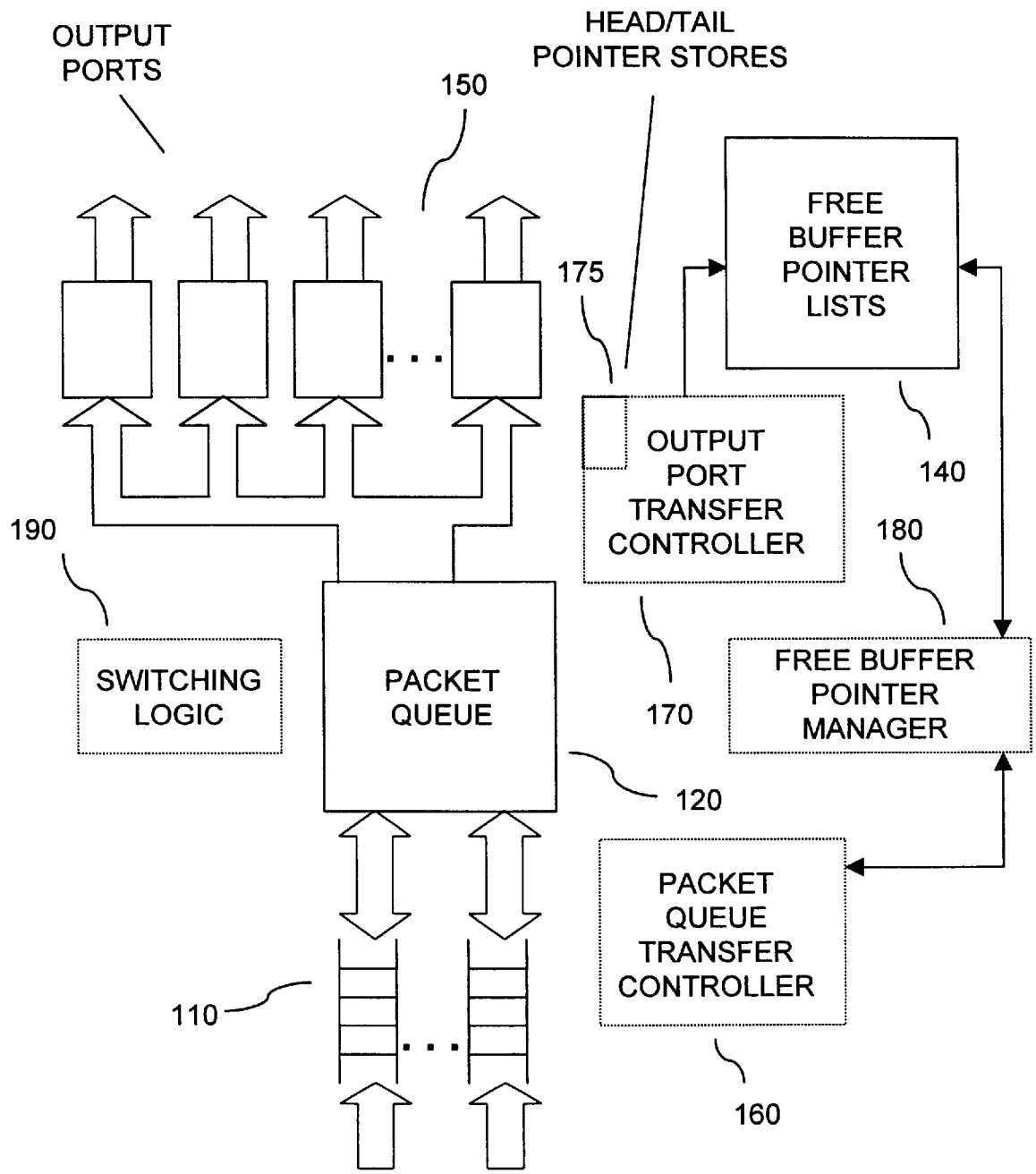
FIG. 1 is a block diagram of a DMA transfer system.

In FIG. 1, a DMA transfer system in which the present invention is operative is shown. Inbound packets are received at FIFOs 110 and are switched to output ports 150. Packets are stored temporarily in logical output queues within packet queue 120 to avoid contention in the system. Contiguous address space in packet queue 120 is provided to each inbound packet by allocating to the inbound packet a group of buffer pointers from a selected one of free buffer pointer lists 140.

Figure 2:
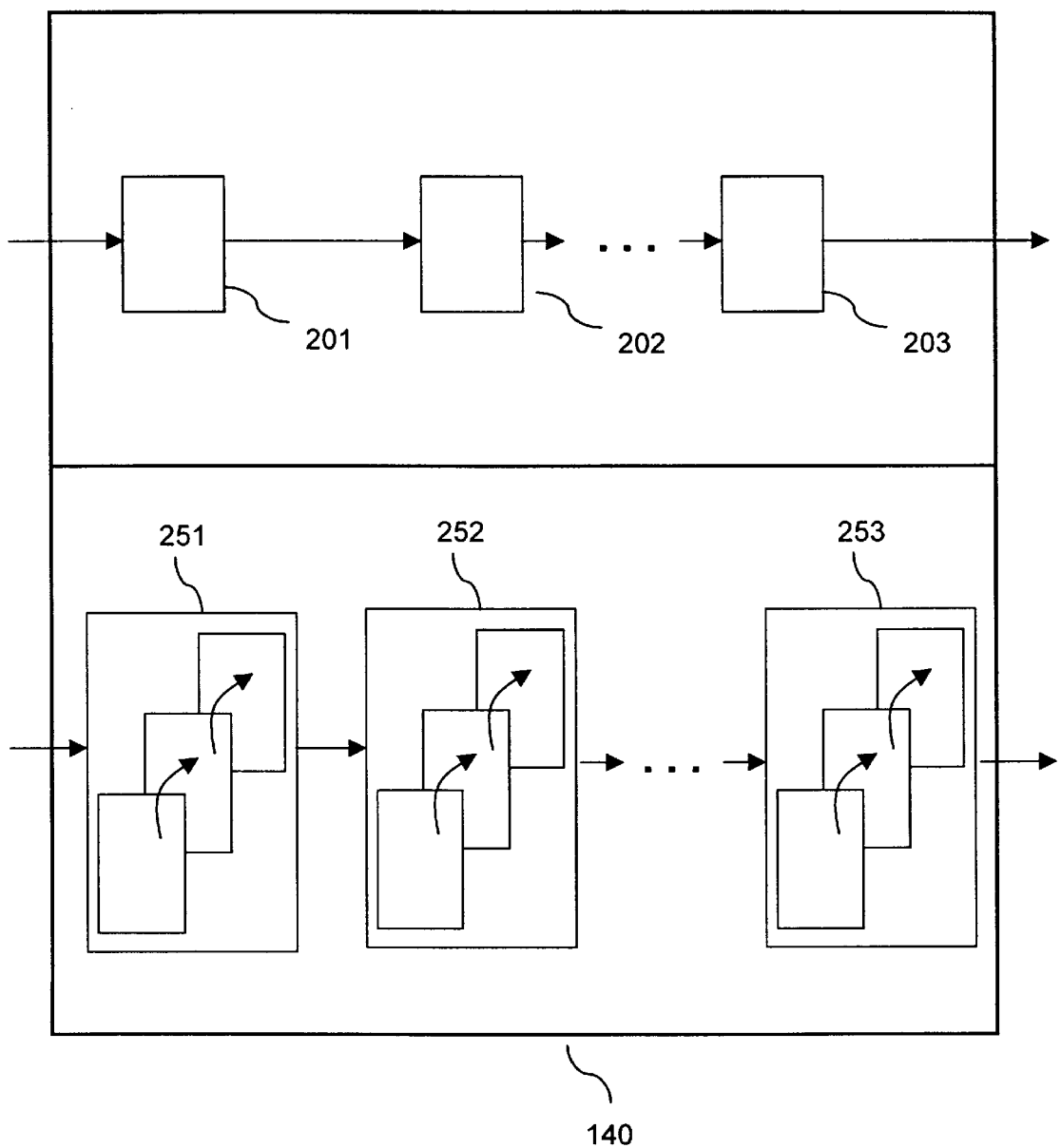
FIG. 2 is a diagram illustrating the free buffer pointer lists in the DMA transfer system according to FIG. 1.

Free lists 140 are shown in greater detail in FIG. 2. Each free list defines a linked list of groups of one or more pointers which address buffers in packet queue 120. Each pointer belongs to exactly one group and each group in the same free list has the same number of pointers. Pointer groups in different free lists have different numbers of pointers. Pointers in the same pointer group address contiguous space in packet queue 120; however, consecutive groups of pointers in the same free list do not necessarily address contiguous space in packet queue 120. The pointers are always pulled-off of the front of a free list in their defined pointer group. By allocating pointers only in their defined groups, returned pointers are guaranteed to be reallocated in a manner which provides contiguous address space even if pointers are returned to the free list in a different order than their order of original allocation. All buffers in packet queue 120 addressed by pointers are the same size and the number of pointers in the groups allocated by free lists 140 are selected such that the contiguous address spaces allocated are at least as large but not substantially larger than the maximum size for packets of different communication protocol types occurring in the DMA transfer system. Thus, while in the illustrated example there are two free lists including pointer groups 201, 202, 203 and 251, 252 and 253, respectively, which include one and three pointers per group, respectively, in environments where other communication protocols are operative there may be different numbers of free lists providing different numbers of pointers per group in a manner tailored to provide an efficient allocation of contiguous address space for such other operative protocols.

Returning to FIG. 1, in operation, packets arrive at a plurality of FIFOs 110 in constant-byte segments. Consecutive segments arriving at a particular FIFO may belong to the same packet or may belong to different packets. The protocol type is learned for each inbound packet. The protocol type may be learned by parsing the packet or, depending on the system, may be presumed from the known traffic pattern on the FIFO on which the inbound packet arrived. A pointer group from the appropriate free list is selected for the inbound packet based on the known or presumed protocol type. In a preferred embodiment, the selected pointer group is allocated from the one of free lists 140 which supplies pointers in the multiple which would result in the lowest over allocation of address space to a maximum size packet of the known or presumed protocol type of the inbound packet. Thus, in the example shown in FIG. 2, where there are two free lists which allocate pointers in groups of one and three, respectively, if the known or presumed protocol type of the inbound packet is ten megabit Ethernet having a maximum packet length of 1518 bytes, and the buffer size is 2K bytes, a pointer group would be selected from the free list from which pointers are allocated in groups of one. Once a predetermined number of segments for an inbound packet has been received, packet queue transfer controller 160 starts a DMA transfer of "chunks" of the segments of the packet into the buffer addressed by the first pointer in the selected pointer group. Pointer groups are made available by the free pointer manager 180, which always pulls pointer groups from the front of free lists 140. Naturally, if two or more of FIFOs 110 have chunks ready for transfer at the same time, an arbitration is conducted to grant time-multiplexed control of packet queue 120 to the competing FIFOs for delivering chunks of packet segments.

Figure 3:
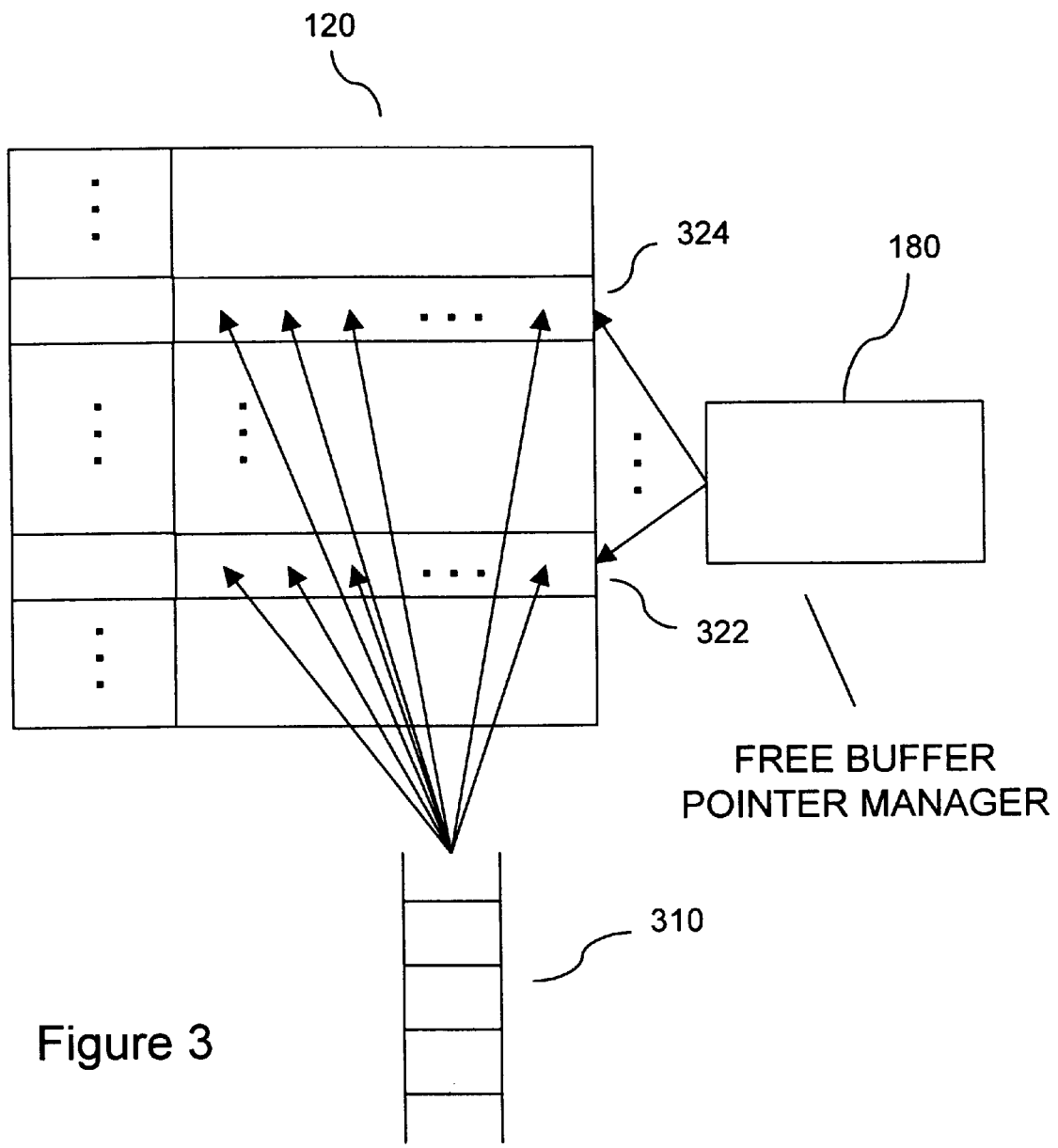
FIG. 3 is a diagram illustrating the manner in which packets are buffered in the packet queue in the DMA transfer system according to FIG. 1.

The manner in which chunks of inbound packets are written to packet queue 120 is shown in FIG. 3. Chunks are written from FIFO 310 to the buffer addressed by the first pointer in the selected pointer group, represented in FIG. 3 by buffer 322. If buffer 322 is filled before the entire packet has been written, chunks are written to the buffer addressed by the second pointer in the pointer group, represented by buffer 324. If buffer 324 is filled before the entire packet is written, chunks are written to the buffer addressed by the third pointer in the pointer group, and so on, until the entire packet has been written to packet queue 120. Of course, pointer groups will include different numbers of pointers depending upon the free list from which they were allocated. Naturally, because the pointers in a pointer group address contiguous address space, inbound packets are guaranteed to be written into a contiguous address space in packet queue 120. Moreover, because the free list from which the pointer group is allocated is the one which allocates pointers in a multiple which would result in the lowest over-allocation of contiguous address space without risking under-allocation, the entire packet is guaranteed to be written before running-out of contiguous address space. Packet queue 120 may be implemented in random access memory (RAM).

Each inbound packet is assigned to a logical output queue which specifies the destination output ports for the packet. Logical output queues include a unicast queue for each output port, for packets destined only to that output port, and a single flood queue for packets for flooding to all output ports. Returning to FIG. 1, logical output queue assignment is facilitated by switching logic 190. In a preferred embodiment, switching logic 190 is implemented in hard-wired logic including content-addressable memory (CAM) logic for performing associative comparisons on identifiers in inbound packets and for resolving such identifiers to switching instructions stored in a switching database. The switching instructions provide, at a minimum, information required to assign a logical output queue for inbound packets. It will be appreciated, however, that other logic, such as a random access memory (RAM) with bit-hashing capabilities, or processor-implemented software, may be used as alternatives to CAM logic for resolving identifiers in inbound packets to switching information.

Figure 4:
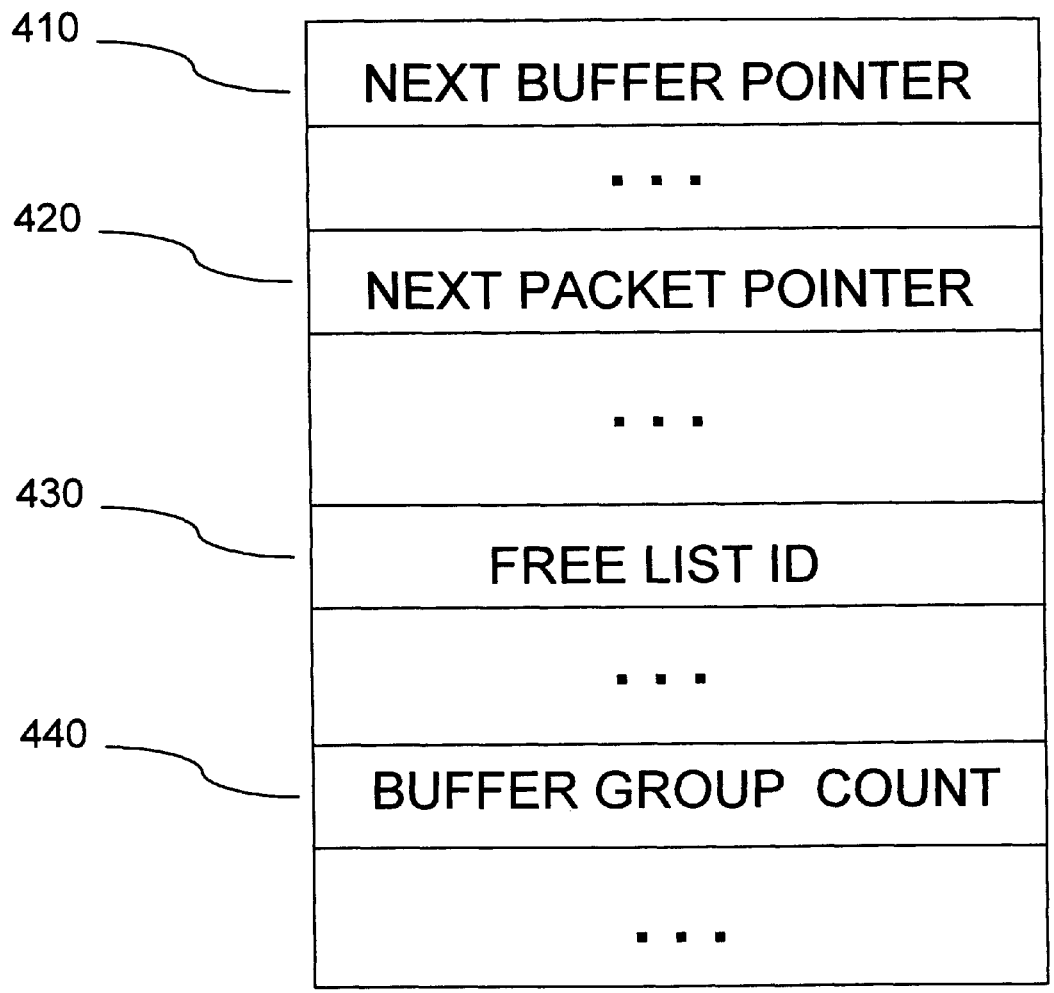
FIG. 4 is a diagram illustrating the format of a buffer header in the DMA transfer system according to FIG. 1.

Headers are constructed in packet queue 120 to link groups of buffers assigned by switching logic 190 to the same logical output queue. Headers are written into address spaces in packet queue 120 to form counterparts to the buffers in which data are awaiting release to output ports 150. In FIG. 4, a representative header 400 is shown to include "next buffer" field 410, "next packet" field 420, a free list identifier field 430 and a buffer group count 440. "Next buffer" field 410 holds a pointer which addresses the next buffer in the logical output queue with which header 400 is associated. "Next packet" field 420 holds a pointer which addresses the first buffer for the next packet in the logical output queue with which the header 400 is associated. Free list identifier field 430 holds a value which identifies the one of free lists 140 from which the pointer stored in "next buffer" field 410 was allocated. Buffer group count 440 holds information sufficient to identify the number of buffers in the buffer group with which header 400 is associated. In addition to pointer fields 410, 420, identifier field 430 and counter field 440, header 400 also includes routing information (not shown) for use at subsequent "hops" to which the packet in the corresponding buffer will be switched after being read from packet queue 120 and unicast/flood queue status information which allows output ports 150 to alternate reads between unicast and flood queues to ensure that packets are transferred to output ports 150 in the same order in which they were transferred to packet queue 120.

Head/tail pointer stores 175 are maintained to track the heads and tails of the logical output queues. Head/tail pointer stores 175 have stored, for each logical output queue, a head pointer which addresses the buffer whose header has a pointer to the buffer at the front of the output queue. Head/tail pointer stores 175 also include, for each logical output queue, a tail pointer which addresses the buffer at the back of the output queue. The tail pointer for a logical output queue is updated whenever a packet has been added to the back of the logical output queue. The head pointer for a logical output queue is updated whenever a packet has been read from the logical output queue. Each output port maintains its own head pointer for the flood queue to enable output ports to read from the flood queue at different paces.

Dequeueing from packet queue 120 is triggered by the updating of tail pointers. Output port transfer controller 170 issues an interrupt command to output ports whose unicast queue tail pointers have been updated. If the flood queue tail pointer has been updated, controller 170 issues an interrupt command to all output ports 150. Interrupted output ports start a DMA transfer of chunks of packet segments from packet queue 120. If two or more of output ports have been interrupted, an arbitration is conducted to grant time-multiplexed control of packet queue 120 to the competing output ports for transferring the chunks of packet segments.

Figure 5:
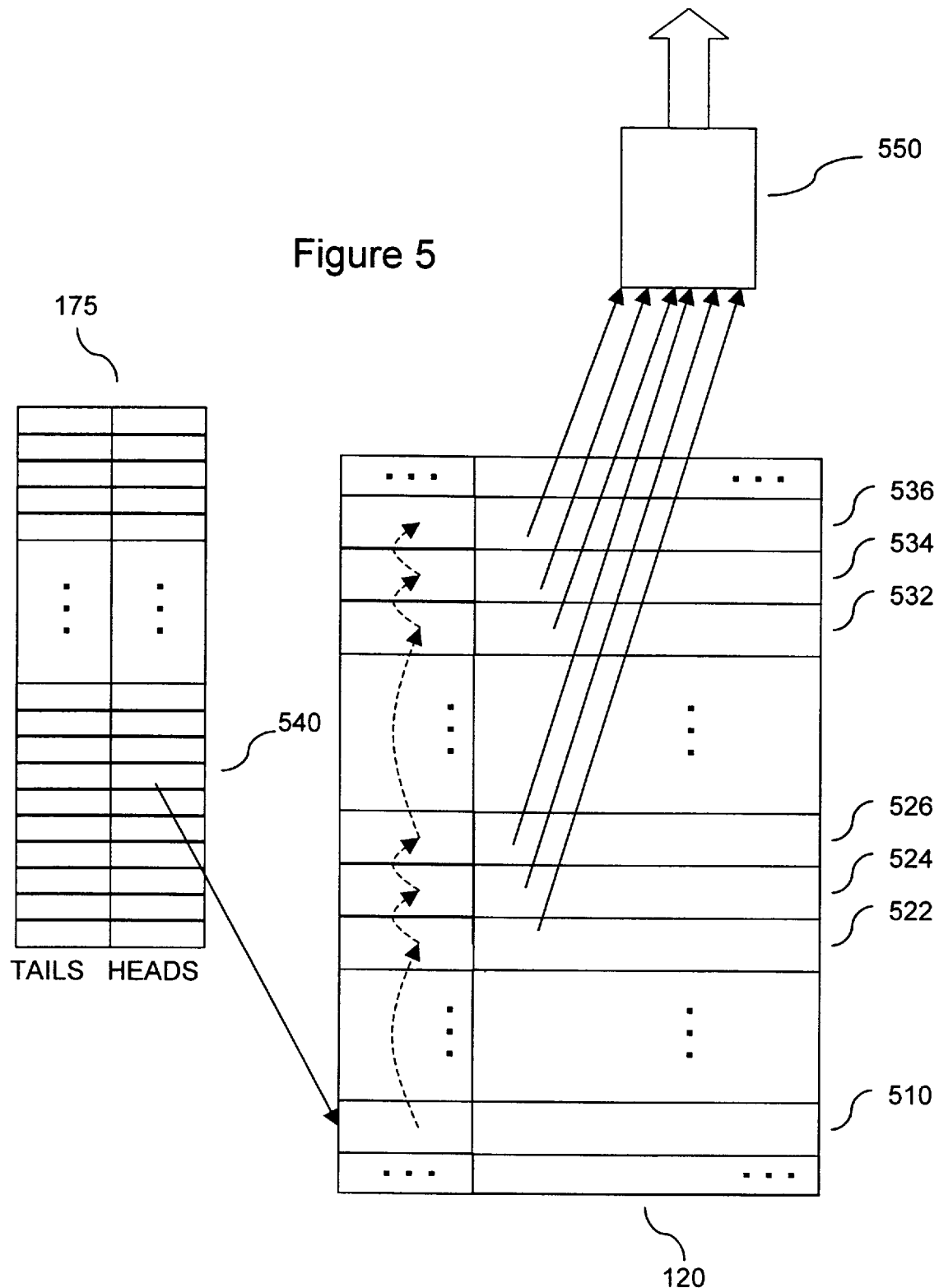
FIG. 5 is a diagram illustrating the manner in which linked buffer headers are consulted to effectuate a read of packets from the packet queue to the output ports in the DMA transfer system of FIG. 1.

The manner in which chunks of outbound packets are read from packet queue 120 is shown in FIG. 5. When output port 550 has control of packet queue 120 for making a transfer from packet queue 120 for its unicast logical output queue, head pointer store 540 for the logical output queue is consulted. The pointer stored in store 540 addresses buffer 510 whose header holds a pointer to buffer 522 at the front of the logical output queue. The pointer is used to address buffer 522 at the front of the output queue and chunks are read from buffer 522 to output port 550. Once all chunks have been read from buffer 522, a pointer in the header in buffer 522 is used to address the next buffer 524 in the logical output queue. Chunks are read from buffer 524 to output port 550. Once all chunks have been read from buffer 524, a pointer in the header of buffer 524 is used to address the next buffer 526 in the output queue and chunks are read from buffer 526 to output port 550, and so on, until the data from all buffers in the output queue have been read to output port 550. The transfer from the next three buffers in the output queue, buffers 532, 534, 536, is illustrated in FIG. 5. Note that buffers in a output queue are not necessarily contiguous, and in the example illustrated in FIG. 5 are not contiguous, because a output queue may at any given time include buffers associated with different pointer groups or pointer groups allocated from different free lists. Naturally, a output queue may at any given time include one or more buffers. Also, because packet queue 120 is a shared resource, the read operation from a particular output queue may be interrupted to accommodate reads from other logical output queues.

Figure 6:
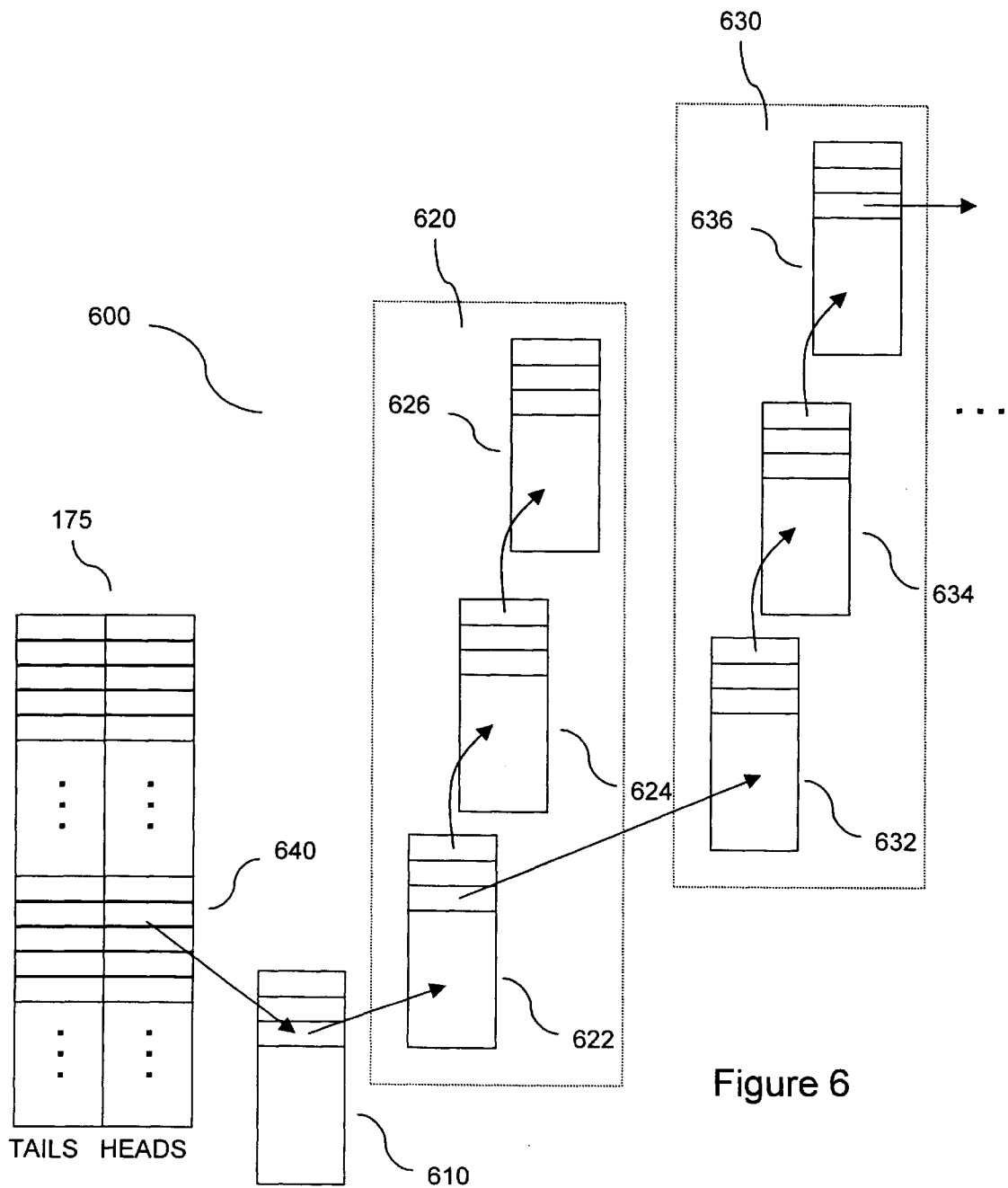
FIG. 6 is a diagram illustrating the manner in which packets are read from the packet queue to output ports in the DMA transfer system according to FIG. 1.

The read operation is described in even greater detail by reference to FIG. 6. Headers are constructed judiciously to link the buffers assigned to a common logical output queue into a chain 600 is shown to include buffer 610, buffers 622, 624, 626 associated with packet 620 and buffers 632, 634, 636 associated with packet 630. Packet 620 is at the front of chain 600 and packet 630 is the next packet in chain 600. Buffers 622, 624, 626 are linked together as a packet by pointers written in the "next buffer" pointer fields of buffers 622 and 624. Buffers 632, 634, 636 are linked together as a packet by pointers written in the "next buffer" pointer fields of buffers 632 and 634. Front packet 620 and next packet 630 are linked as consecutive packets in the same output queue by the pointer written in the "next packet" pointer field of buffer 622. Head store 640 for the logical output queue is linked to front packet 620 by the pointer written the "next packet" pointer field of buffer 610. Buffer 610 is the last buffer from which data was read for the logical output queue, unless no buffers from the logical output queue have yet been read, in which event buffer 610 is a placeholder having an address to which the pointer in head queue 640 is initialized to point at start-up. When an output port has control of packet queue 120 for making a transfer from the logical output queue with which buffer chain 600 is associated, head store 640 is consulted and the pointer therein is used to address buffer 610. "Next packet" field in buffer 610 is consulted and the pointer therein is used to address buffer 622. The buffer group count in buffer 622 is consulted to determine how many buffers are linked in the packet. Data are read from buffer 622. After all data have been read from buffer 622, "next buffer" field in buffer 622 is consulted and the pointer therein is used to address buffer 624. After all data have been read from buffer 624, the "next buffer" field in buffer 624 is consulted and the buffer pointer therein is used to address buffer 626. "Next pointer" field in buffer 622 is consulted and the pointer therein is used to address buffer 632. The buffer group count in buffer 632 is consulted to determine how many buffers are linked in the packet. Data are read from buffer 632. After all data have been read from buffer 632, "next buffer" field in buffer 632 is consulted and the pointer therein addresses buffer 634. The remaining buffers in the output queue, buffers 636, 636, etc. are "walked down" in similar fashion to read the data in the remaining buffers in the output queue to the output port. Of course, in accordance with different multiples in which pointer groups are allocated, packets in a output queue, whether consecutive or not, need not be stored in the same number of buffers, but may span different numbers of buffers depending upon the system configuration and the protocol type of the packets.

When an output port's unicast queue and the flood queue both have packets for dequeueing, the output port selects between those output queues to the extent required to read packets to the output port in the same order they were written to packet queue 120. The order is maintained with the assistance of unicast/flood queue status information stored in "flood write" and "flood read" counters. A "flood read" counter is kept for each output port. The "flood write" counter is incremented whenever a packet is written in the flood queue. The "flood read" counter for a particular output port is incremented whenever a packet is read from the flood queue to the output port. Whenever a packet is written to the tail of an output port's unicast queue, the current value in the "flood write" counter is written in a field in the buffer header of the packet. With this configuration in place, whenever the output port has control of the packet queue for reading a packet therefrom, the "flood write" value from the packet at the head of the output port's unicast queue is compared with the current value in the output port's "flood read" counter. If the current value in the "flood read" counter is less than the "flood write" value from the packet, it is known that the packet at the head of the unicast queue was written to the packet queue after the packet at the head of the flood queue. Therefore, the flood queue is selected and a packet is read from the flood queue to the output port. If, on the other hand, the current value in the "flood read" counter is not less than the "flood write" value from the packet, it is known that the packet at the head of the unicast queue was not written after the packet at the head of the flood queue. Therefore, the unicast queue is selected and a packet is read from the unicast queue to the output port. By following this basic scheme, packets are read to each output port from its two competing logical output queues in the same order in which the packets were written to packet queue 120.

To enable sustained operation of the DMA transfer system, pointers are returned to the back of the same free list from which they were originally allocated. Pointers associated with the same packet in a unicast queue are returned as a group after the pointer in the "next packet" field has been used as described in FIG. 6 to address the next packet in the output queue. The return operation is accomplished by consulting the identifier in the free list identifier field in the same header as the pointer in the "next packet" field and returning the pointers to the back of the identified free list. Pointers associated with the same packet in the flood queue are not returned until the pointer in the "next packet" field has been used by all output ports to address the next packet in the output queue. Accordingly, the number of output port reads from the flood queue is monitored by a "yet-to-read" value which indicates, for each packet in the output queue, how many output ports have yet to complete a read of the data in the packet. The "yet-to-read" value is initially set equal to the number of output ports 150. Whenever an output port has completed its read of the packet, the value is decremented by one. When the "yet-to-read" value has been decremented to zero, the pointer held in the "next packet" field of the header is returned after the next use of the pointer to address the next packet in the output queue.

Figure 7:
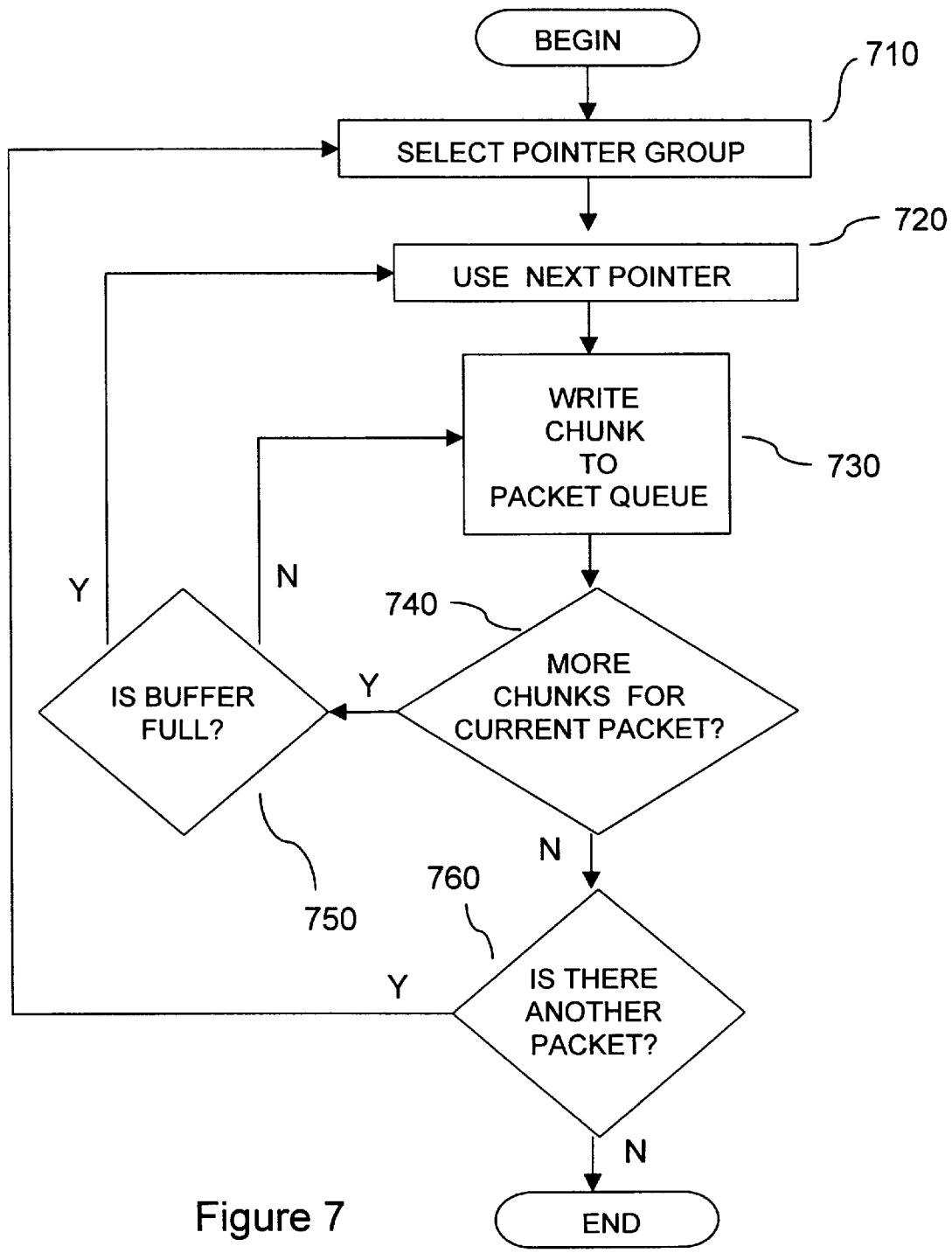
FIG. 7 is a flow diagram illustrating DMA processing and transfer of inbound packets from the FIFOs to the packet queue in a DMA transfer system.

Referring now to FIG. 7, a flow diagram illustrates DMA processing and transfer of inbound packets from FIFOs to a packet queue in a preferred embodiment. When an inbound packet arrives, a pointer group from the appropriate one of the free lists is selected (710) and the first pointer in the selected pointer group is used (720) to transfer the first chunk of the packet to the buffer addressed by the pointer (730). If there are more chunks in the current packet for transfer (740) and the buffer is not full (750), the next chunk is always written to the same buffer (730). If there are more chunks in the current packet (740) and the buffer is full (750), the next pointer in the selected group is always used (720) to transfer the next chunk of the packet to the buffer addressed by the pointer (730). When there are no more chunks in the current packet (760), the process is repeated anew on the next packet, if any.

Turning finally to FIG. 8, a flow diagram illustrates DMA processing and transfer of packets from the packet queue to output ports in a preferred embodiment. When one or more output ports has a packet for dequeueing from one or both of its associated logical output queues, the appropriate queue is selected (810) and the "next packet" pointer in the header associated with the last-read buffer or the placeholder buffer, whichever the case may be, for the selected output queue is used to address the buffer at the front of the selected queue, i.e., the first buffer of the current packet (820). The first buffer's data are transferred to the output port (830). If the current output queue is a unicast queue (840), the "next packet" pointer which was used to address the front buffer is returned to the free list from which it was allocated along with other pointers for the last-read packet (850). If the current output queue is the flood queue, a further inquiry is made to determine if the last-read packet has been transferred to all output ports (860) and the pointers are returned to the appropriate free list only if this condition has been satisfied. Regardless, if there is another pointer for the current packet (870) the "next buffer" pointer is always used to address the next buffer (875) and the buffer's data are transferred to the output port (830). If there are no more pointers for the current packet, it is always determined whether a change between the unicast and flood queues is indicated for the next packet transfer for the particular output port (880). If a queue change is indicated, dequeueing is conducted on the next packet in the alternate queue. If a queue change is not indicated, dequeueing is conducted on the next packet for the same queue, if any (890).

Although known or presumed communication protocol type is the packet-specific characteristic which governs free list configuration and pointer group selection in a preferred embodiment, free lists may be configured and pointer groups selected based on numerous other characteristics to provide efficient allocation of contiguous address space. By way of example, other governing characteristics may include packet length. It will therefore be appreciated by those of ordinary skill in the art that the invention may be embodied in other specific forms without departing from the spirit or essential character hereof. The present description is therefore considered in all respects to be illustrative and not restrictive.

The scope of the invention is indicated by the appended claims, and all changes that come within the meaning and range of equivalents thereof are intended to be embraced therein.

We claim:

1. A data transfer system, comprising:

a source storage area for receiving data units;

a destination storage area;

a plurality of lists, the lists identifying blocks of contiguous address space in the destination storage area of different sizes;

means for allocating each data unit a block of contiguous address space from one of the lists;

means for transferring the data unit from the source storage area to the allocated block of contiguous address space;

means for transferring the data unit from the allocated blocks of contiguous address space to an output port, the means for transferring comprising:

means for creating a plurality of logical output queues, each logical output queue being associated with an output port, each logical output queue acting as a temporary storage for the data unit stored in the blocks of contiguous address space intended for the output port;

means for linking the blocks of contiguous address space in the logical output queue; and means for transferring the data unit from the linked blocks of contiguous address space in the logical output queue; and means for returning the allocated block of contiguous address space to the list from which the address space was allocated.

2. The data transfer system according to claim 1, wherein the size of the block of contiguous address space allocated to each data unit is selected based on a predetermined criterion.

3. The data transfer system according to claim 2, wherein the criterion is the protocol type of the data unit.

4. The data transfer system according to claim 2, wherein the source storage area includes a plurality of source storage units and the criterion is the source storage unit on which the data unit was received.

5. The data transfer system according to claim 3, wherein the criterion is the length of the data unit.

6. A data transfer system, comprising:

a source storage area for receiving data units;

a destination storage area having a plurality of buffers;

a plurality of free lists, each free list including a plurality of pointer groups, each pointer group in a first free list addressing a first multiple of contiguous buffers in the destination storage area, each pointer group in a second free list addressing a second multiple of contiguous buffers in the destination storage area, wherein the first and second multiples are different;

means for allocating each data unit a pointer group from one of the free lists; and means for transferring the data unit from the source storage area to the contiguous buffers addressed by the allocated pointer group;

means for transferring the data unit from the buffers addressed by allocated pointer group to an output port, the means for transferring comprising:

means for creating a plurality of logical output queues, each logical output queue being associated with an output port, each logical output queue acting as a temporary storage for the data unit stored in the buffers addressed by the allocated pointer group intended for the output port; and means for linking the buffers in the logical output queue;

means for transferring the data unit from the linked buffers in the logical output queue; and means for returning the pointers in the allocated pointer group to the free list from which the pointer group was allocated.

7. The data transfer system of claim 1, wherein the logical output queue includes a unicast queue associated with each output port, the unicast queue including data units destined only to the associated output port.

8. The data transfer system of claim 1, wherein the logical output queue includes a single flood queue associated with each output port, the single flood queue including data units destined to all output ports.

9. The data transfer system according to claim 7, wherein the number of contiguous buffers addressed by the allocated pointer group is selected for each data unit based on a predetermined criterion.

10. The data transfer system according to claim 9, wherein the criterion is the protocol type of the data unit.

11. The data transfer system according to claim 9, wherein the source storage area includes a plurality of source storage units and the criterion is the source storage unit on which the data unit was received.

12. The data transfer system according to claim 9, wherein the criterion is the length of the data unit.

13. The data transfer system according to claim 7, wherein each buffer has the same amount of address space.

14. The data transfer system of claim 6, wherein the logical output queue includes a unicast queue associated with each output port, the unicast queue including data units destined only to the associated output port.

15. The data transfer system of claim 6, wherein the logical output queue includes a single flood queue associated with each output port, the single flood queue including data units destined to all output ports.

16. In a data transfer system having a source storage area for receiving data units, a destination storage area having a plurality of buffers, a plurality of free lists, wherein each free list includes a plurality of pointer groups, each pointer group in a first free list addressing a first multiple of contiguous buffers in the destination storage area, each buffer group in a second free buffer list addressing a second multiple of contiguous buffers in the destination storage area, wherein the first and second multiples are different, a method for transferring data units from the source storage area to the destination storage area, comprising:

allocating each data unit a pointer group from one of the free lists;

transferring the data unit from the source storage area to the contiguous buffers addressed by the allocated pointer group;

creating a plurality of logical output queues, each logical output queue being associated with an output port, each logical output queue acting as a temporary storage for the data unit stored in the contiguous buffers associated with the output port;

linking the contiguous buffers in the logical output queue;

transferring the data unit from the linked buffers in the logical output queue to the output port; and returning the pointers in the allocated pointer group to the free list from which the pointer group was allocated.

17. The method according to claim 16, further comprising:
   selecting a free buffer list for each data unit based on a predetermined criterion.

18. The method according to claim 15, wherein the criterion is the protocol type of the data unit.

19. The method according to claim 15, wherein the source storage area includes a plurality of source storage units and the criterion is the source storage unit on which the data unit was received.

20. The method according to claim 15, wherein the criterion is packet length.

21. The method according to claim 14, wherein each buffer has the same amount of address space.

22. A data transfer system comprising:
   a source storage area for receiving data units intended for a plurality of output ports;
   a destination storage area having a plurality of buffers for storing the data units intended for the plurality of output ports;
   a plurality of free lists, each free list including a plurality of pointer groups, each pointer group in a first free list addressing a first multiple of contiguous buffers in the destination storage area, each pointer group in a second free list addressing a second multiple of contiguous buffers in the destination storage area, wherein the first and second multiples are different;
   means for allocating each data unit a pointer group from one of the free lists;
   means for transferring the data unit from the source storage area to the contiguous buffers addressed by the allocated pointer group;
   means for creating a first logical output queue, the first logical output queue acting as a temporary storage space for the data unit stored in the contiguous buffers intended for a first output port;
   means for creating a second logical output queue, the second logical output queue acting as a temporary storage space for the data unit stored in the contiguous buffers intended for a second output port;
   means for linking the contiguous buffers in the first logical output queue;
   means for linking the contiguous buffers in the second logical output queue;
   means for transferring the data unit from the linked buffers in the first and second logical output queues to the corresponding output ports; and
   means for returning the pointers in the allocated pointer group to the free list from which the pointer group was allocated.

* * * * *